Patented Dec. 14, 1926.

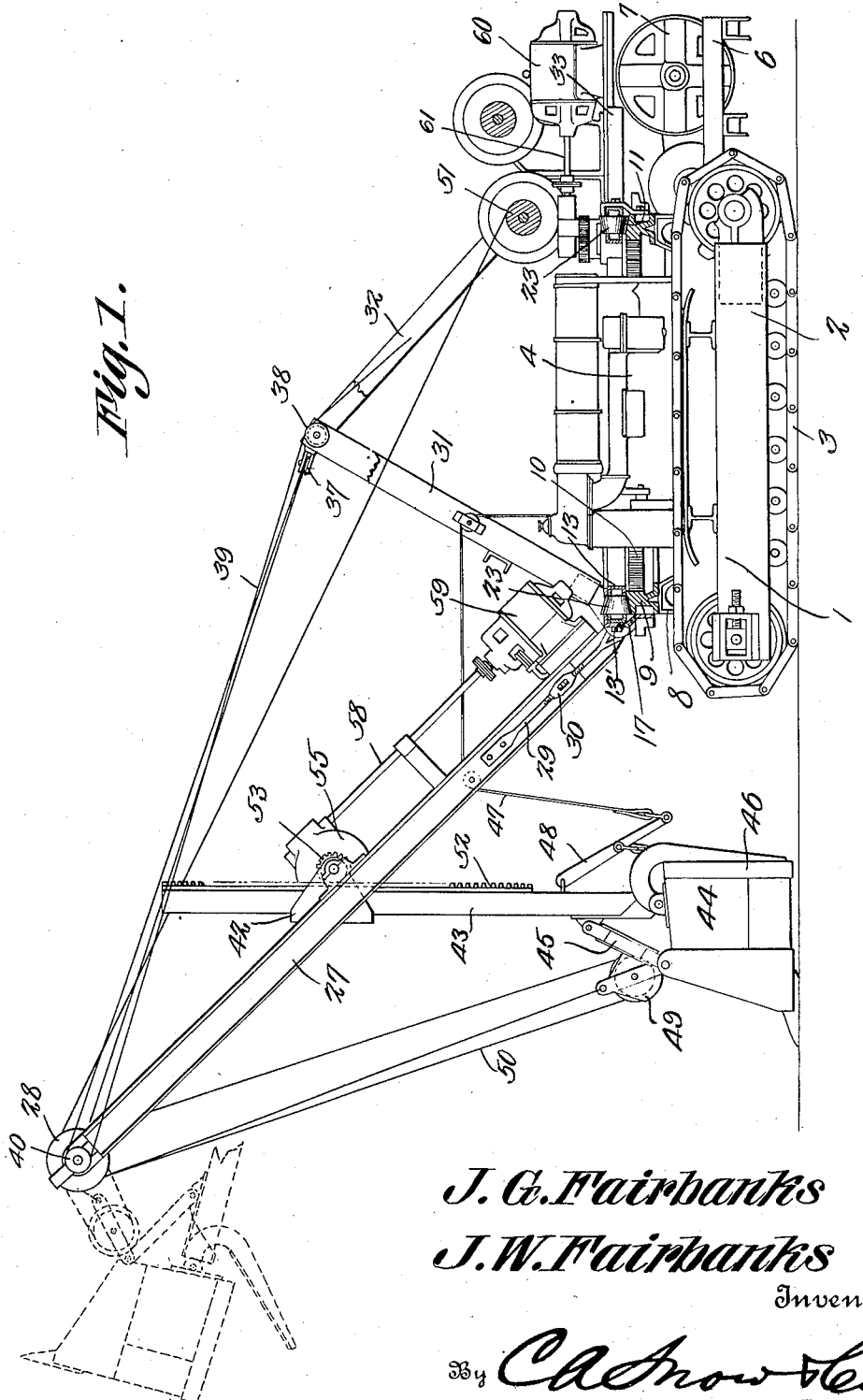

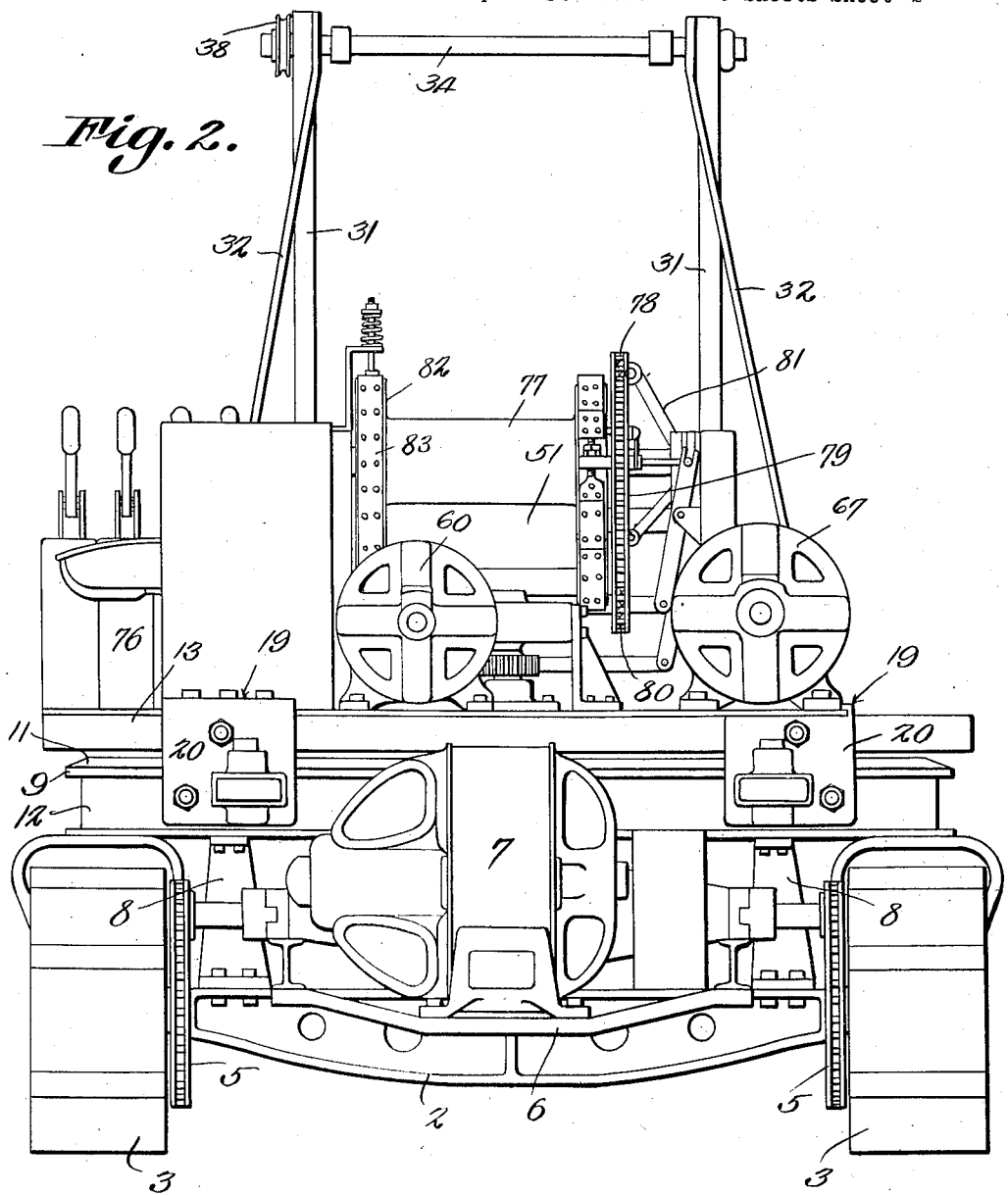

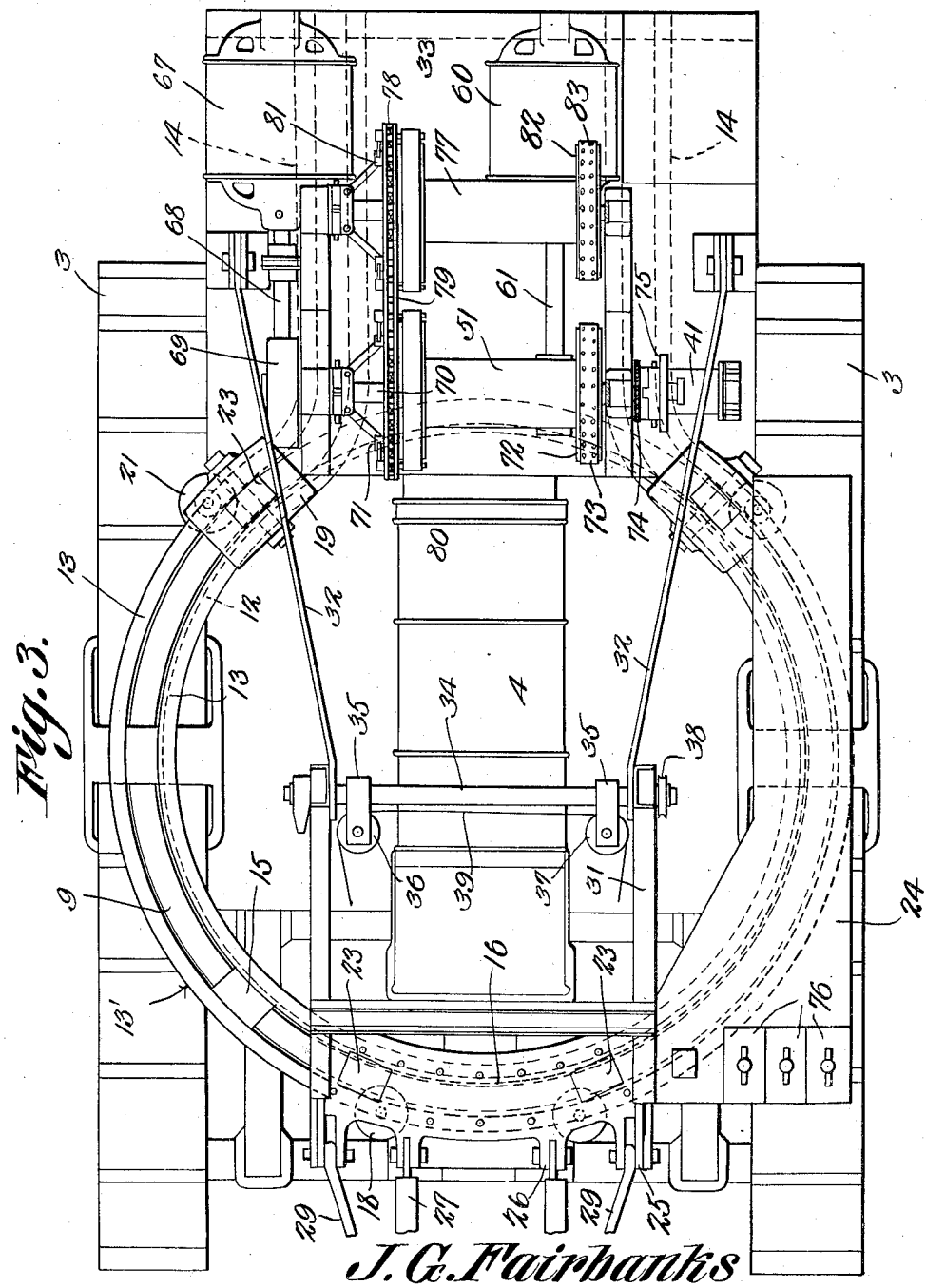

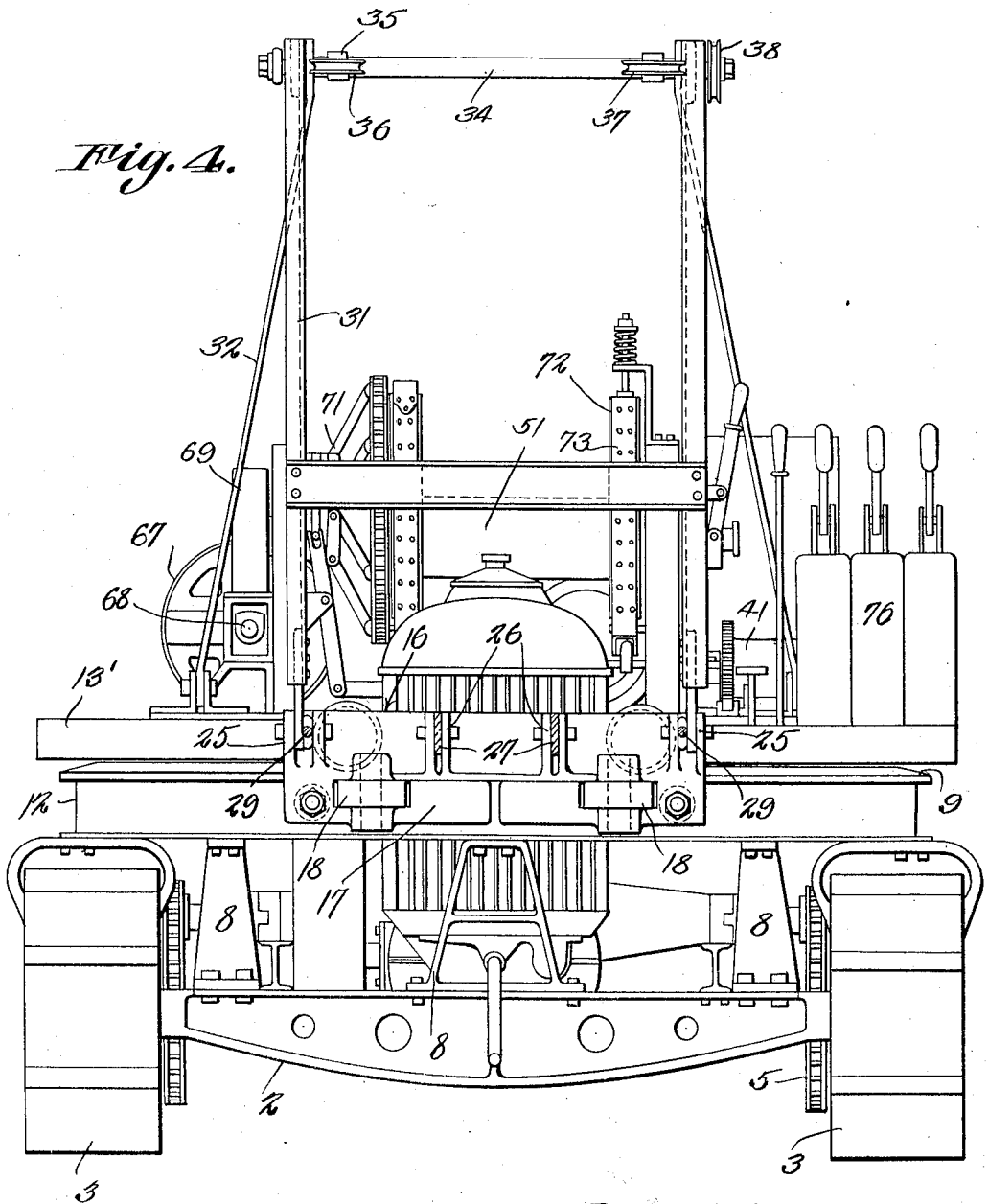

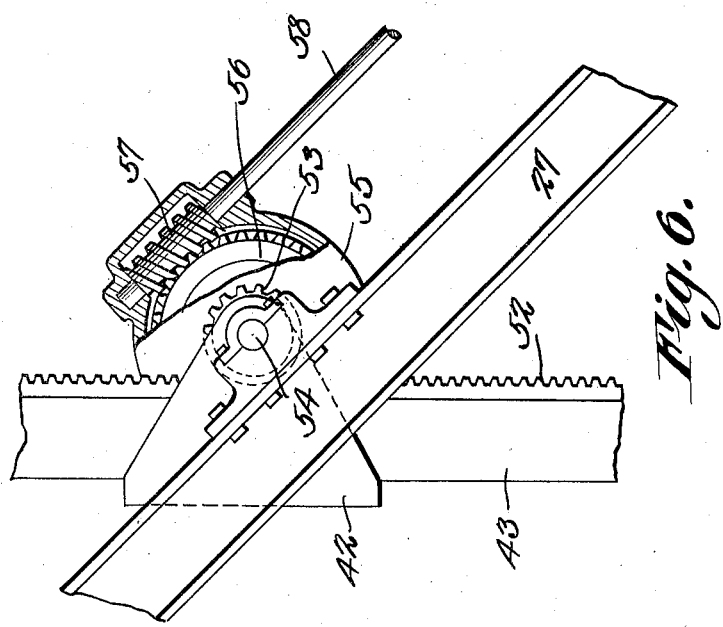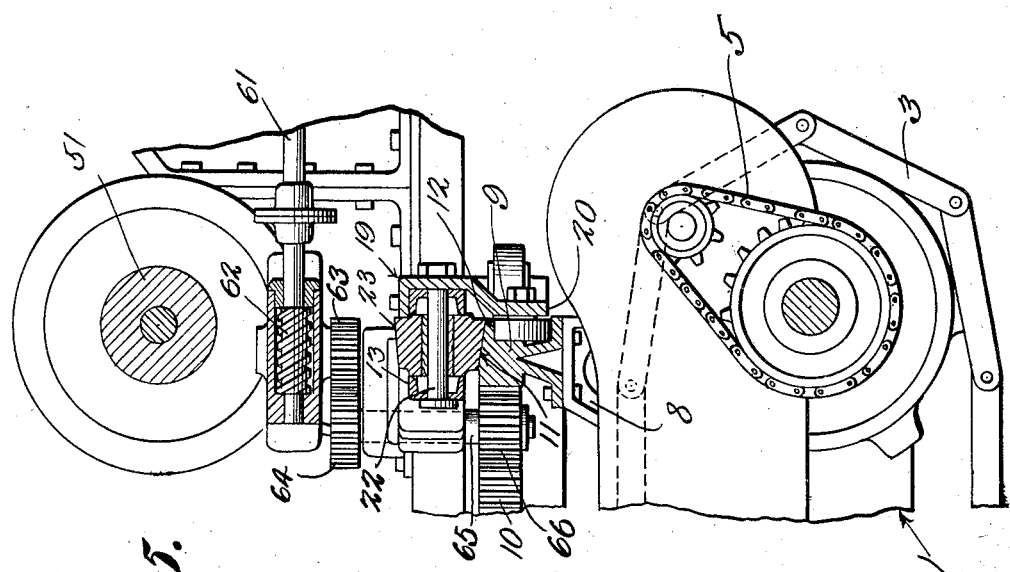

1,610,502

UNITED STATES PATENT OFFICE.

JAMES G. FAIRBANKS AND JOHN W. FAIRBANKS, OF MARION, OHIO.

EXCAVATOR.

Application filed April 14, 1926. Serial No. 101,986.

This invention relates to excavators and more especially to an excavating unit adapted to be combined with a tractor, one of the objects being to so position the excavating unit with reference to the tractor that the turn table is free to make a complete rotation.

A further object is to provide an excavator wherein the engine of the tractor is utilized for the purpose of operating an electric generator, electric motors being employed for performing the several operations of rotating the turn table, hoisting the bucket, and "crowding" the bucket.

A further object is to provide an excavator which does not require the use of a center post or trunnion for receiving the strains resulting from tipping or crowding of the turn table.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the complete machine, the turn table and some of the adjacent parts being shown in section.

Figure 2 is a rear elevation.

Figure 3 is a plan view of the tractor and turn table and the mechanism thereon.

Figure 4 is a front elevation, the boom and the parts carried thereby being removed.

Figure 5 is a vertical section through a portion of the mechanism employed for rotating the turn table.

Figure 6 is a view partly in elevation and partly in section of a portion of the "crowding" mechanism.

Referring to the figures by characters of reference 1 designates a tractor including a frame 2 supported by endless belt treads 3 and carrying an engine 4 adapted to transmit motion through a chain and sprocket mechanism 5 to the endless belt treads as shown, for example, in Figure 5. This frame 2 has an extension 6 supporting an electric generator 7 and any suitable means, not shown, may be employed for transmitting motion to the generator from the engine 4. Brackets 8 are mounted on the frame of the tractor 1 for supporting a circular rail 9 fixedly connected thereto and having teeth 10 upon its inner or concave surface so as to constitute a ring gear. The top surface of the rail 9 is beveled downwardly and outwardly as at 11. An annular channel 12 is formed in the periphery of the circular rail 9.

The foregoing structure constitutes the tractor per se and the mechanism constituting the excavator is adapted to be mounted on this tractor. This mechanism includes spaced parallel channel beams 13 bent to provide an arcuate frame 13' extending through approximately 300° and having its terminals extended rearwardly along parallel lines as indicated at 14. The beams 12 can be fixedly connected at desired intervals by cross members 15 or the like interposed therebetween and secured thereto. At the center of the arcuate portion, which is substantially diametrically opposite the arms 14, is a plate 16 having a depending flange 17 in which are journaled retaining rollers 18 which project into the annular channel 13.

Plates 19 are secured to the beams 12 close to the arms 14 and have depending portions 20 in the form of flanges in which are journaled rollers 21 which extend into the annular channel 12. Extending transversely within the beams 13 beneath the plates 19 and also beneath the plate 16 are bearing pins 22 on which are journaled tapered rollers 23 which bear downwardly upon the beveled top face 11 of the rail 9. Thus it will be seen that while the frame formed of the beams 13 is free to rotate through 360° upon the rail 9, it cannot tilt or become otherwise displaced relative thereto. A narrow platform 24 can be mounted on one side of the rotatable frame where it will not interfere with the rotation of the frame about the engine 4 and on this frame can be mounted the controlling mechanism of the excavator.

Extending forwardly from the flange 17 of the front plate 16 are separate pairs of brackets 25 and 26 and pivotally connected to the bracket 26 are the side beams 27 suitably connected to constitute a boom carrying a sheave 28 at its upper or outer end. Braces 29 which include turnbuckles 30 are secured to the sides of the beams 27 and diverge therefrom, these braces being pivotally connected to the bracket 25 as shown in Figure 3.

An upwardly extending inclined frame 31 is mounted on the front plate 16 and is supported by braces 32 extending downwardly and rearwardly and suitably fastened to the rearwardly projecting portion 33 of the turn table. This frame is provided, at its upper end, with a cross member 34 having forwardly extending bearings 35 in which are journaled sheaves 36 and 37 located close to the respective sides of the frame 31. Another sheave 38 is mounted on one side of the frame 31 adjacent the top thereof. A cable 39 is secured at one end to the upper end of the boom 27 and extends rearwardly into engagement with the sheave 36 and thence transversely into engagement with the sheave 37 from which it extends forwardly into engagement with a pulley 40 journaled on the upper end portion of the boom 27. From this pulley the cable is extended backwardly over the sheave 38 and thence downwardly to a drum 41. Thus it will be seen that by rotating this drum in one direction the boom 27 will be swung upwardly whereas by rotating the drum in the opposite direction and unwinding the cable therefrom, the boom will be permitted to swing downwardly.

A guide 42 is supported by the boom and mounted to slide and swing therein is the beam 43 carrying a bucket 44. This bucket can be properly connected to the beam by means of braces 45 or the like and has a hinged bottom 46 of the usual or any preferred type adapted to be released by a pull through a cable 47 upon a lever 48 connected to the bottom or to the release mechanism thereof. This specific mechanism constitutes no part of the present invention and for that reason has not been shown or described in detail.

A sheave 49 is connected to the bucket 44 and connected to this bucket adjacent the sheave is one end of a cable 50. This cable is extended upwardly over sheave 28, downwardly under sheave 49, upwardly over sheave 28 and thence rearwardly to drum 51. Thus it will be seen that by rotating drum 51 in one direction the cable 50 will pull on the bucket and cause it to swing forwardly and upwardly whereas, by paying out the cable 50 from the drum 51 the bucket can be allowed to gravitate.

A rack 52 is carried by the beam 43 and meshes with a gear 53 secured to a shaft 54 journaled on and extending tranversely of the boom 27. Said shaft extends through a housing 55 mounted on the boom and in which is arranged a worm gear 56 fixedly secured to the shaft 54. A worm 57 meshes with the gear 56 and is journaled in the housing 55, this worm being carried by the upper end portion of a shaft 58 the lower end of which is coupled to and driven by the shaft of an electric motor 59. This motor is mounted on the lower portion of the boom 27. Thus it will be seen that when the motor is operated in one direction the gear 53 will move the rack 52 and beam 43 upwardly so as to elevate the bucket and when the motor is reversed the bucket will be lowered. By providing worm gear such as shown and described the bucket is retained in any position to which it may be moved unless shifted by the rotation of shaft 58.

An electric motor 60 is mounted on the extension 33 of the turn table and the shaft 61 of this motor is coupled to a worm 62 forming part of a worm gearing of the type shown for example in Figure 6. This worm gearing is employed for driving a gear 63 which meshes with a gear 64 secured to one end portion of a shaft 65. This shaft is journaled within and extends downwardly from the turn table and carries a gear 66 at its lower end which meshes constantly with the ring gear 10. Thus it will be seen that when the motor 60 is actuated motion will be transmitted therefrom to the ring gear and the gear 66 will be caused to travel therealong, causing the turn table to move in a circle relative to the rail 9 supporting it.

An electric motor 67 is supported by the extension 33 of the turn table and is adapted to transmit motion from its shaft 68 through worm gearing located in a housing 69 to a shaft 70. This worm gearing is similar to that shown in detail in Figure 6 and is also similar to the gearing indicated at 62. Drum 51 is mounted for rotation on the shaft 70 but is adapted to be coupled thereto and uncoupled therefrom by a clutch 71 operated by any suitable mechanism provided for that purpose. Shaft 70 has a brake wheel 72 at one end provided with a brake band 73 which can be operated by any suitable mechanism provided for that purpose and secured to one end of shaft 70 is one sprocket 74 of a chain and sprocket mechanism designed to transmit motion to the drum 41 from the shaft 70. A clutch 75 can be provided for coupling the sprocket to or uncoupling it from the shaft 70 and this may be operated by preferred mechanism. The clutch, the brake mechanism, the means for transmitting motion from shaft 70 to the drum 41, and the clutch 75, are all parts which, in themselves, constitute no part of the present invention and for that reason detailed description and illustration thereof is not deemed necessary.

As before stated the various controls can be mounted on the platform 24 and these may include separate controllers 76 whereby the flow of current from the generator to the several motors can be controlled.

It will be apparent that when it is desired to revolve the turn table so as to bring the boom to any desired angle relative to the side of the tractor, it merely becomes necessary to drive the motor 60 so as to cause motion to be transmitted therefrom to the turn table as hereinafter explained. The parts are so mounted that this turn table can be revolved in a complete circle, said turn table extending around and being movable relative to the motor 4 as already pointed out. In view of the particular mounting of the turn table on its supporting rail, the same will not tilt relative to the tractor.

Should the operator desire to raise or lower the bucket, the controls of the motor 59 are actuated so as to cause the beam 43 to move upwardly or downwardly. Motor 67 serves to drive the shaft 70 and by shifting the clutch 71 the drum 51 can be caused to rotate in one direction so as to wind the cable 50 thereon and cause the bucket and its beam 43 to swing forwardly and upwardly as indicated, for example, by broken lines in Figure 1. By releasing drum 51 from its clutch and applying the brake band 73, the bucket can be allowed to swing downwardly under control. By means of clutch 75 the drum 41 can be actuated to shift the cable 39 and thus swing the boom 27 upwardly. By releasing the clutch the boom can be permitted to swing downwardly as desired.

The parts heretofore described are used primarily when the machine is employed as a standard excavating shovel. However should it be desired to use the machine as a drag line excavator, clam shell or back filler, it is necessary to use a drum 77 having a sprocket 78 which receives motion through a chain 79 from a sprocket 80 carried by the drum 51. By means of a suitable clutch 81 the sprocket 78 can be coupled to or uncoupled from the drum 77. Thus it will be seen that drum 77 can be driven from the motor 67, the operation of the clutch 71 serving to couple drum 51 to or to uncouple it from the sprocket 80 and the shaft 70. Drum 77 can also be provided with a brake wheel 82 and a brake band 83 for controlling the rotation of the drum when uncoupled from its driving mechanism.

It is to be understood that various mechanisms other than those described can be utilized for transmitting motion from the motors to the cables and the means employed for this purpose does not in itself constitute any part of the present invention.

What is claimed is:

1. The combination with a wheel supported tractor frame and an engine carried thereby, of a circular supporting rail mounted on the frame and extending around the motor, a turn table extending around the motor and movably mounted on the rail, a boom extending from the turn table, and means under the control of an operator for rotating the turn table and the boom through a complete circle about the engine.

2. The combination with a tractor including an engine, of a turn table extending around the engine, and means actuated by the engine for propelling the turn table and rotating the same through a complete circle around the engine.

3. The combination with a tractor including an engine, of a circular rail extending around the engine and supported by the tractor, a turn table mounted on the rail, cooperating means upon the rail and turn table for holding the turn table against tilting relative to the rail, a boom carried by the turn table, and means actuated by the engine and cooperating with the rail for rotating the turn table through a complete circle about the engine.

4. The combination with a tractor including an engine, of a circular rail supported by the tractor and extending around the engine, a turn table mounted on the rail, a boom carried by the turn table, a shovel, a beam extending therefrom and supported by the boom, means driven by the engine and cooperating with the circular rail for rotating the turn table through a complete circle relative to the engine, and means operated by the engine for actuating the shovel beam.

5. The combination with a tractor including an engine, of a circular rail mounted on the tractor and encircling the engine, said rail constituting a ring gear, a turn table supported by and mounted for complete rotation upon the rail relative to the engine, a boom carried by the turn table, a bucket mounted to swing relative to the boom, a beam supporting the bucket mounted for up and down movement relative to the boom, an upstanding frame upon the turn table, and separate mechanisms operated by the engine for rotating the turn table through a complete circle relative to the engine, for raising and lowering the boom, for raising and lowering the shovel beam, and for swinging the shovel relative to the boom.

6. The combination with a tractor including a frame, an engine thereon, and a circular track mounted on the frame and encircling the engine, of a series of teeth upon the inner surface of the track constituting a ring gear, spaced beams fixedly connected, rollers journaled therebetween and bearing upon the circular rail, the coperating faces of the rail and rollers being beveled, there being an annular channel in the periphery of the rail, rollers carried by the frame and working within the channel to hold the frame assembled with the rail, an extension supported by the frame, said frame and extension constituting a turn table, a shaft journaled within the turn table, a gear carried thereby meshing with the ring gear, and worm gearing actuated by the engine for driving the gear to rotate the turn table through a complete circle.

7. The combination with a tractor including a frame, an engine thereon, of a circular track fixedly mounted on the frame and encircling the engine, of a series of teeth upon the inner surface of the track constituting a ring gear, spaced beams fixedly connected, rollers journaled therebetween and bearing upon the circular rail, the cooperating faces of the rail and rollers being beveled, there being an annular channel in the periphery of the rail, rollers carried by the frame and working within the channel to hold the frame assembled with the rail, an extension supported by the frame, said frame and extension constituting a turn table, a shaft journaled within the turn table, a gear carried thereby meshing with the ring gear, worm gearing for actuating the gear to rotate the turn table through a complete circle about the engine, and means movable with the turn table for actuating the turn table.

In testimony that we claim the foregoing as our own, we have hereto affixed our signatures.

JAMES G. FAIRBANKS.
JOHN W. FAIRBANKS.